United States Patent
Kunkel et al.

(10) Patent No.: US 9,741,375 B2
(45) Date of Patent: Aug. 22, 2017

(54) SLIDER TRAILING EDGE CONTAMINATION SENSOR

(71) Applicant: Seagate Technology LLC, Cupertino, CA (US)

(72) Inventors: Gary Joseph Kunkel, Minneapolis, MN (US); Narayanan Ramakrishnan, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/946,166

(22) Filed: Nov. 19, 2015

(65) Prior Publication Data

US 2017/0148475 A1    May 25, 2017

(51) Int. Cl.
*G11B 5/60*    (2006.01)
*G11B 5/40*    (2006.01)

(52) U.S. Cl.
CPC ............ *G11B 5/40* (2013.01); *G11B 5/6005* (2013.01)

(58) Field of Classification Search
CPC .............................. G11B 5/60; G11B 5/6076
USPC ............................................. 360/234–234.9
See application file for complete search history.

(56) References Cited

U.S. PATENT DOCUMENTS

| | | | | |
|---|---|---|---|---|
| 5,450,747 A * | 9/1995 | Flechsig | G11B 33/10 | 310/319 |
| 5,808,184 A * | 9/1998 | Boutaghou | G01B 5/28 | 73/105 |
| 5,872,311 A * | 2/1999 | Schaenzer | G01B 7/345 | 73/105 |
| 5,913,250 A * | 6/1999 | Wible | G01F 1/684 | 73/861.65 |
| 6,262,572 B1 * | 7/2001 | Franco | G11B 5/012 | 324/212 |
| 6,265,222 B1 * | 7/2001 | DiMeo, Jr. | G01N 21/59 | 422/83 |
| 6,583,959 B1 * | 6/2003 | Hall | G11B 5/6005 | 360/234.2 |
| 6,853,508 B2 | 2/2005 | Smith et al. | | |
| 7,016,139 B2 | 3/2006 | Baumgart et al. | | |
| 7,500,392 B1 * | 3/2009 | Plowman | G01F 1/6845 | 73/204.26 |
| 8,514,521 B2 | 8/2013 | Ma et al. | | |
| 8,681,438 B1 * | 3/2014 | Powers | G11B 5/40 | 360/25 |
| 8,873,191 B2 | 10/2014 | Li et al. | | |
| 8,929,008 B1 | 1/2015 | O'Dell et al. | | |

(Continued)

FOREIGN PATENT DOCUMENTS

KR    20110061682 A  *  6/2011

OTHER PUBLICATIONS

Nov. 10, 2015, Lepkowski et al., "Designing RC Oscillator Circuits with Low Voltage Operational Amplifiers and Comparators for Precision Sensor Applications", On Semiconductor, printed from internet on Nov. 10, 2015, 28 pages.

*Primary Examiner* — Allen T Cao
(74) *Attorney, Agent, or Firm* — Hollingsworth Davis, LLC

(57) ABSTRACT

A slider of a magnetic recording head has a leading edge, a trailing edge, and an air bearing surface between the leading and trailing edges. A sensor is situated at the trailing edge of the slider and configured to sense presence of a lube droplet or other contaminant at the trailing edge.

20 Claims, 15 Drawing Sheets

(56) References Cited

U.S. PATENT DOCUMENTS

| | | | | |
|---|---|---|---|---|
| 2002/0071215 A1* | 6/2002 | Lewis | ............ | G11B 5/40 |
| | | | | 360/235.7 |
| 2002/0130069 A1* | 9/2002 | Moskoff | ............ | C02F 1/008 |
| | | | | 210/85 |
| 2006/0092570 A1* | 5/2006 | Payne | ............ | G11B 5/3133 |
| | | | | 360/236.5 |
| 2008/0007871 A1* | 1/2008 | Kiyono | ............ | G11B 5/6005 |
| | | | | 360/235.4 |
| 2008/0106818 A1* | 5/2008 | Cha | ............ | G11B 5/6005 |
| | | | | 360/97.13 |
| 2010/0196737 A1* | 8/2010 | Dugas | ............ | G11B 5/8404 |
| | | | | 428/800 |
| 2011/0149706 A1* | 6/2011 | Duan | ............ | G11B 5/40 |
| | | | | 369/53.41 |
| 2012/0120527 A1* | 5/2012 | Kunkel | ............ | G11B 5/607 |
| | | | | 360/235.4 |
| 2014/0139953 A1* | 5/2014 | Hatch | ............ | G11B 5/4873 |
| | | | | 360/234.5 |
| 2014/0268419 A1* | 9/2014 | Kunkel | ............ | G11B 5/607 |
| | | | | 360/234.4 |

* cited by examiner

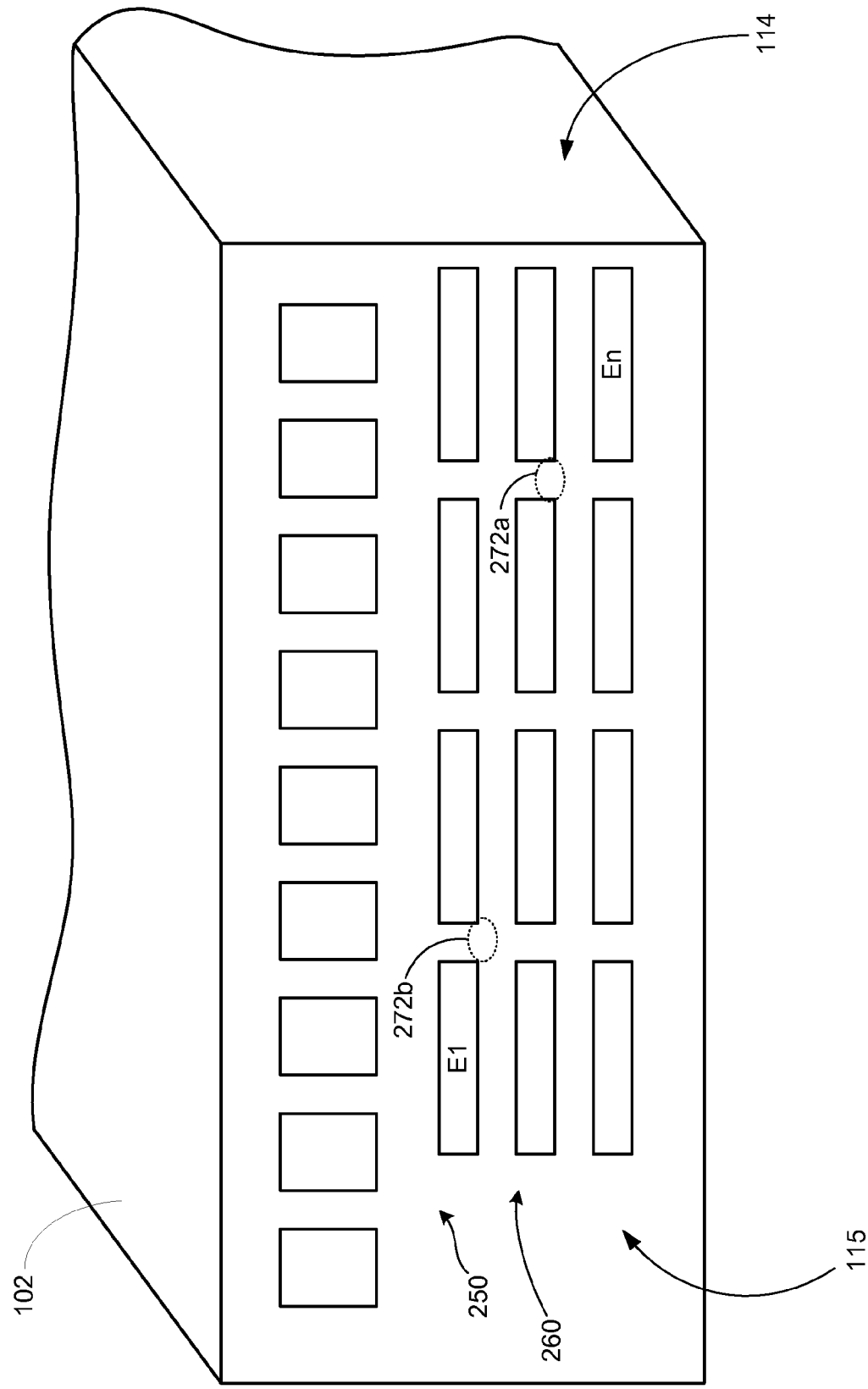

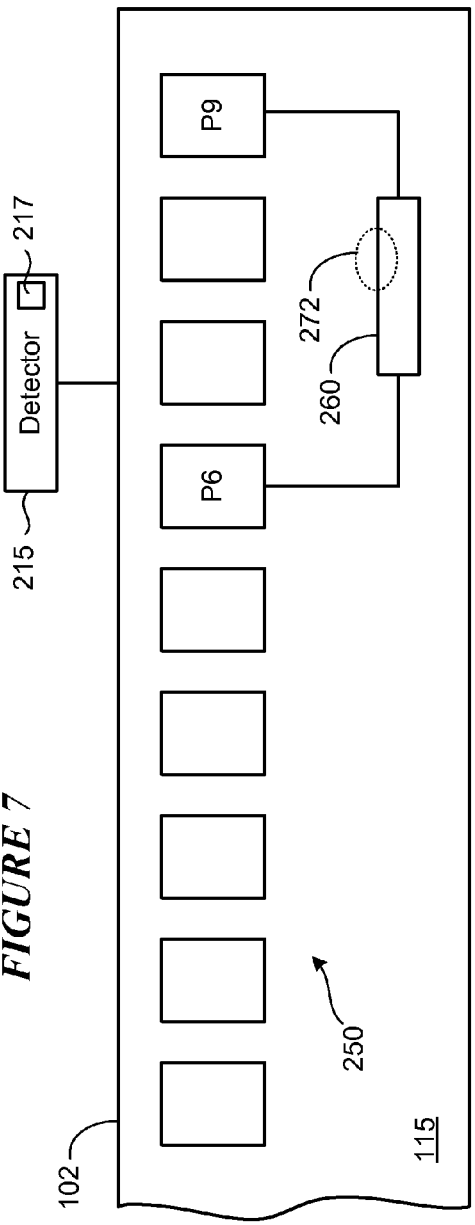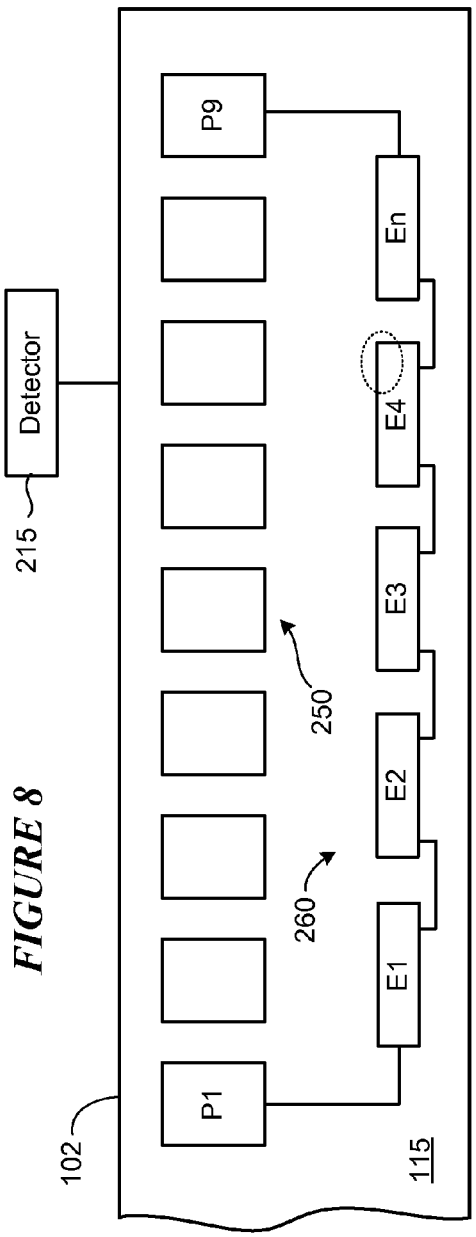

SLIDER TRAILING EDGE CONTAMINATION SENSOR

SUMMARY

Embodiments of the disclosure are directed to an apparatus comprising a slider of a magnetic recording head having a leading edge, a trailing edge, and an air bearing surface between the leading and trailing edges. A sensor is situated at the trailing edge of the slider and configured to sense presence of a lube droplet or other contaminant at the trailing edge.

Some embodiments are directed to an apparatus comprising a slider of a magnetic recording head having a leading edge, a trailing edge, and an air bearing surface between the leading and trailing edges. A sensor is situated at the trailing edge of the slider and configured to sense presence of a lube droplet at the trailing edge. A detector is coupled to the sensor and configured to generate a signal in response to the sensor sensing presence of the lube droplet or other contaminant.

Other embodiments are directed to a method comprising providing relative movement between a magnetic recording medium and a slider of a magnetic recording head. The medium comprises a layer of lubrication and the slider comprises a leading edge, a trailing edge, and an air bearing surface between the leading and trailing edges. The method also comprises sensing presence of a lube droplet or other contaminant at the trailing edge.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 6 illustrates a slider which includes a sensor configured for sensing a lube droplet or lube bridge at the trailing edge of the slider in accordance with various embodiments;

FIG. 7 illustrates a slider which includes a thermal sensor configured for sensing a lube droplet or lube bridge at the trailing edge of the slider in accordance with various embodiments;

FIG. 8 illustrates a slider which includes a thermal sensor configured for sensing a lube droplet or lube bridge at the trailing edge of the slider in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to magnetic recording devices used for data storage. Data storage systems may include one or more transducers that respectively write, via a writer, and read, via a reader, information to and from a magnetic storage medium. The reader and writer are components disposed on an aerodynamic slider of the magnetic recording transducer. It is typically desirable to have a relatively small distance or separation between a transducer and its associated media. This distance or spacing is referred to herein as head-media separation. By reducing the head-media separation, writers and readers are generally better able to write and read data to and from a recording medium, allowing for an increase in storage capacity (e.g., tracks per inch or bits per inch). Reducing the head-media separation, however, can result in accumulation of contaminants (e.g., lubricant) on the surface of slider, in particular the trailing edge of the slider, due to interaction between the slider and a lubricant provided on a surface of the recording medium.

Figure 1:
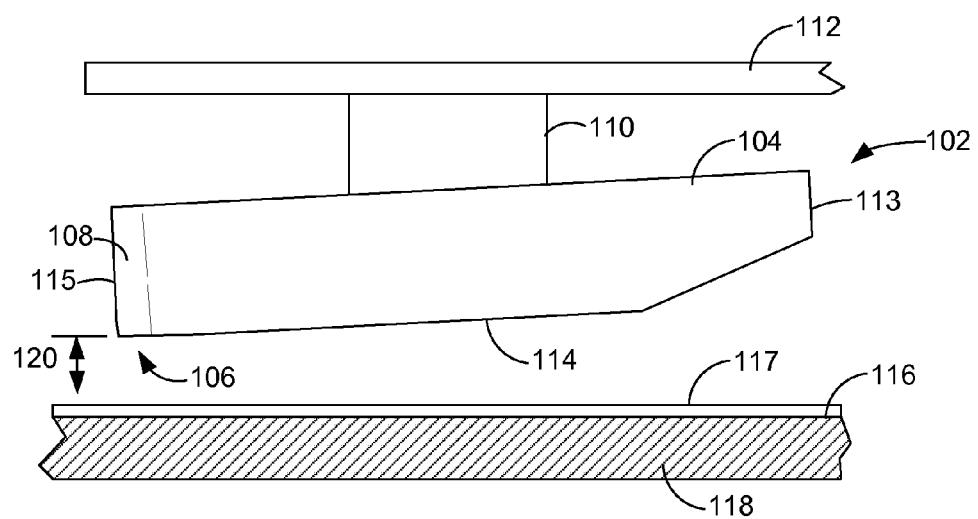
FIG. 1 is a schematic representation of a slider in which the various embodiments disclosed herein may be implemented.

Turning now to FIG. 1, a side view of a slider 102 is illustrated. The slider 102 includes a slider body 104 having a leading edge 113, a trailing edge 115, and an air bearing surface (ABS) 114 between the leading and trailing edges 113 and 115. The slider 102 also includes a transducer portion 106 provided within overcoat 108 at the trailing edge 115 of the slider 102. The slider 102 is attached via suspension 110 to an arm 112. The ABS 114 of the slider 102 is shown proximate the surface 116 of a magnetic recording medium 118. During operation, a fly height 120 is maintained between the slider 102 and the disk 118. A layer of lubrication 117 is shown covering the surface 116 of the medium 118. The lubricant 117 (referred to herein as lube) is typically applied to the medium surface 116 as a molecularly thin-film (e.g., a thickness from 10 to 50 Angstroms), and serves to reduce wear of the surface 116 due to contact with the slider 102. Perfluoropolyethers (PFPEs) are often used as an effective lubricant for thin-film recording media.

Figure 2:
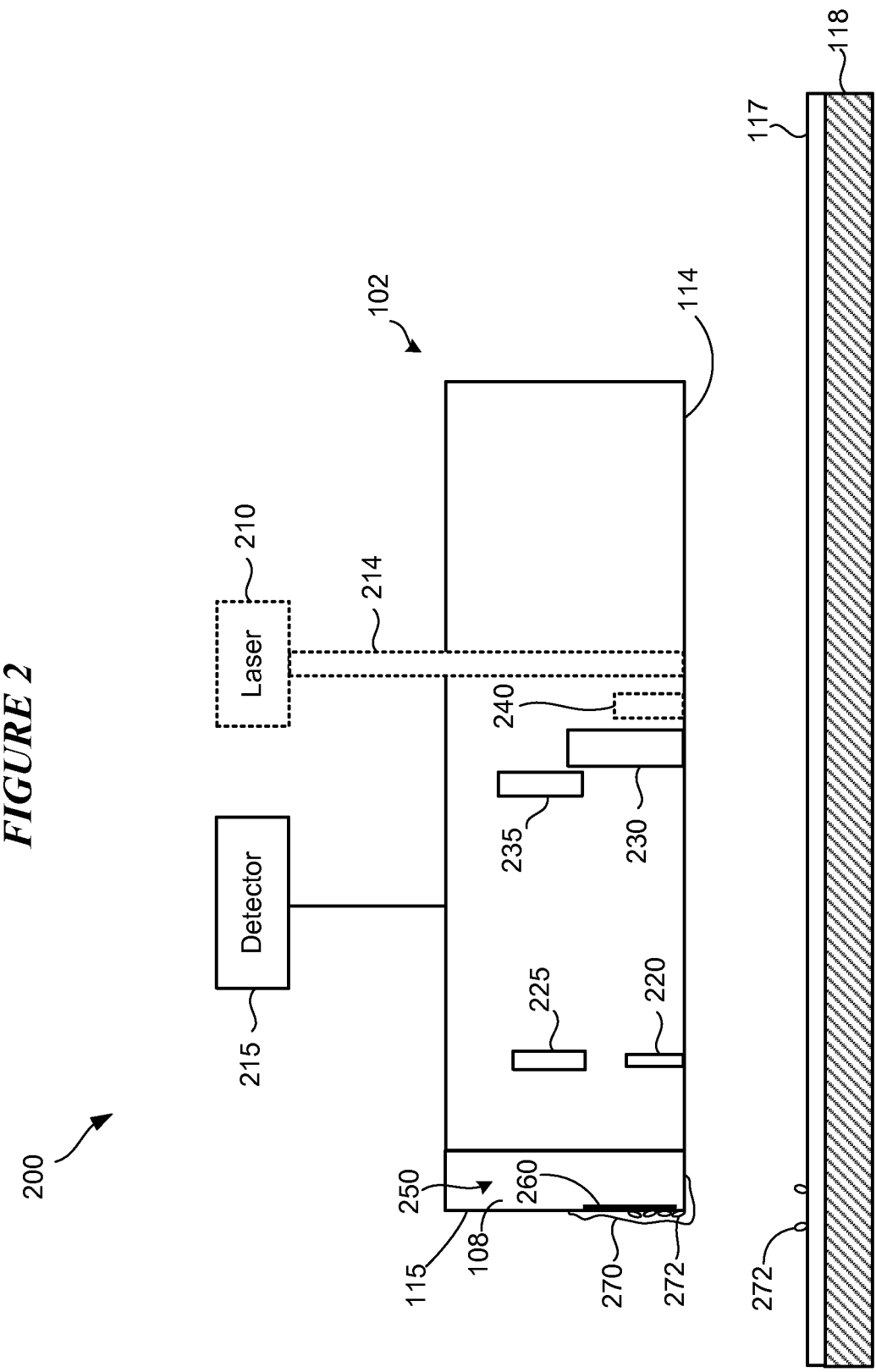
FIG. 2 shows a recording head arrangement which incorporates a sensor at the trailing edge of a slider in accordance with various embodiments.

FIG. 2 shows a recording head arrangement 200 in accordance with various embodiments. The recording head arrangement 200 includes a slider 102 positioned proximate a rotating magnetic recording medium 118. The slider 102 includes a reader 220 and a writer 230 proximate the ABS 114 for respectively reading and writing data from/to the magnetic recording medium 118. The writer 230 includes a corresponding heater 235, and the reader 220 also includes a corresponding heater 225 according to various embodiments. The writer heater 235 can be powered to cause protrusion of the ABS 114 predominately in the ABS region at or proximate the writer 230 and the reader heater 225 can be powered to cause protrusion of the ABS 114 predominately in the ABS region at or proximate the reader 220. Activation of both the writer and reader heaters 235 and 225 causes protrusion of the pole tip region of the slider 102. Power can be controllably delivered independently to the heaters 225 and 235 to adjust the fly height (e.g., clearance) of the slider 102 relative to the surface of the recording medium 118.

According to some embodiments, the recording head arrangement 200 can be configured for heat-assisted magnetic recording (HAMR). HAMR generally refers to the concept of locally heating a magnetic recording medium to reduce coercivity at the heated location. This allows the applied magnetic writing fields to more easily direct the magnetization during the temporary magnetic softening of the medium caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the coercivity is reduced such that the magnetic write field is sufficient to write to the media. Once the media cools to ambient temperature, the coercivity has a sufficiently high value to assure thermal stability of the recorded information.

In order to achieve desired data density, a HAMR recording head includes optical components that direct light from a light source 210, such as a laser diode, to the recording medium 118 via an optical waveguide 214. The light source 210 can be mounted external, or integral, to the slider 102. It is desirable that the HAMR media hotspot be smaller than a half-wavelength of light available from current sources (e.g., laser diodes). Due to what is known as the diffraction limit, optical components cannot focus the light at this scale. One way to achieve tiny confined hot spots is to use an NFT 240, such as a plasmonic optical antenna. The NFT 240 is designed to support local surface-plasmon at a designed light wavelength. At resonance, high electric field surrounds the NFT 240 due to the collective oscillation of electrons in the metal. Part of the field will tunnel into the medium 118 and get absorbed, raising the temperature of the medium locally for recording. During recording, a write pole of the writer 230 applies a magnetic field to the heated portion of the medium 118. The heat lowers the magnetic coercivity of the media, allowing the applied field to change the magnetic orientation of heated portion. The magnetic orientation of the heated portion determines whether a one or a zero is recorded. By varying the magnetic field applied to the magnetic recording medium 118 while it is moving, data is encoded onto the medium 118. It is understood that embodiments of the disclosure may be implemented in a wide variety of recording heads, including those configured for conventional magnetic recording or HAMR.

The slider 102 includes a number of bond pads (not shown in FIG. 2, but see FIGS. 4-11) on the trailing edge of the slider 102. These bond pads are connected through the overcoat 108 to various components, e.g., reader, writer, heaters, sensors, etc. of the slider 102. The current industry standard of nine pads include bond pads R+ and R− for the reader, W+ and W− for the writer, GND for ground (which defines the ground potential of the slider body 102), Sensor+ and Sensor− for the temperature sensor (e.g., a dual-ended coefficient of resistance temperature sensor or DETCR), and HTR1 and HTR2 for the writer and reader heaters, respectively. During fabrication of a slider 102, the bond pads 250 are electrically connected to the electrical connections (e.g., traces) along the suspension 110 (shown in FIG. 1). It should be noted that more or less bond pads may be used as appropriate to a specific application, e.g., the need for a dedicated bond pad, additional bond pads to accommodate additional readers, writers, heaters, sensors or other components, additional bond pads to accommodate a heat-assisted magnetic recording (HAMR) laser, etc.

The representative slider 102 of FIG. 2 is shown to include an accumulation of lubricant or lube 270 at the trailing edge 115. As the slider 102 files over the surface of the recording medium 118, the slider 102 interacts with the lube 117 and hydrocarbon contaminants on the medium 118. Over time, the lube 117 and contaminants transfers to the slider 102 and accumulate on the trailing edge 115 of the slider 102. Droplets 272 of the lube 117 (alone or with other contaminants) can form on the trailing edge 115. The size of lube droplets 272 varies widely, but are generally observed within a range of between about 0.1 μm to about 100 μm. Larger droplet (>100 microns) are also observed in some instances, depending on drive operating cycle and history as well as air bearing design. Typical lube droplets 272 that form on the trailing edge 115 have a size (e.g., diameter or cross-sectional dimension) ranging between about 20 and 30 μm. If the droplets 272 grow large enough, the droplets 272 can form a lube bridge on the trailing edge 115 or drop off of the slider 102 and settle on the surface of the recording medium 118 (more specifically, on the lube surface 117). For simplicity of explanation, the term "lube droplet" can also encompass the term "lube bridge." Although these formations differ, the term "lube droplet" is used interchangeably with "lube bridge" throughout this disclosure.

In some instances, the lube droplets 272 that settle on the medium 118 can spread back onto the lubrication layer 117 of the medium 118 or are sheared off by air shear or by contact with the slider 102. In other instances, however, the recording head arrangement 200 may be performing a write operation at the same time the slider 102 encounters a lube droplet 272 protruding from the surface of the recording medium 118. In such instances, a significant vertical excursion of the slider 102 takes place, and the signal is not properly written to the surface of the recording medium 118. More specifically, the data is written with the slider 102 at an abnormally large head-medium spacing which causes incomplete overwrite of old data and results in a skip-write error. Contact between the slider 102 and a protruding lube droplet 272 can also result in undesirable excitation of slider 102 at a resonance frequency. This undesirable slider excitation can cause flying height modulation resulting in poor writing.

FIG. 2 further shows a sensor 260 situated at the trailing edge 115 of the slider. The sensor 260 is configured to sense presence of a lube droplet 272 or a lube bridge (or other contamination) at the trailing edge 115. A detector 215, coupled to the sensor 260, can be configured to detect presence of the lube droplet 272 or lube bridge in response to a signal produced by the sensor 260. For example, the detector 215 can be configured to compare the signal produced by the sensor 260 to a reference signal (e.g., a detection threshold signal). The reference signal used by the detector 215 can be indicative of detection threshold developed as a predefined percentage change (e.g., >2%, 5%, or 10% change) in the sensor signal, for example. If the sensor signal exceeds the reference signal (e.g., in magnitude) by a predetermined threshold, detection of a lube droplet 272 or lube bridge is declared. Various forms of corrective action can then be carried out to address the presence of a lube droplet 272 or lube bridge detected on the trailing edge 115 of the slider 102.

According to some embodiments, the sensor 260 comprises a single sensing element. In other embodiments, the sensor 260 comprises a multiplicity of sensing elements, such as an array of elements. For example, the sensor 260 can be implemented to include one or an array of thermal sensors. In other embodiments, the sensor to 260 can be implemented to include one or an array of capacitance sensors. In further embodiments, the sensor 260 can be implemented to include one or more open circuits, wherein presence of a lube droplet or lube bridge closes one or more of the open circuits.

Figure 3:
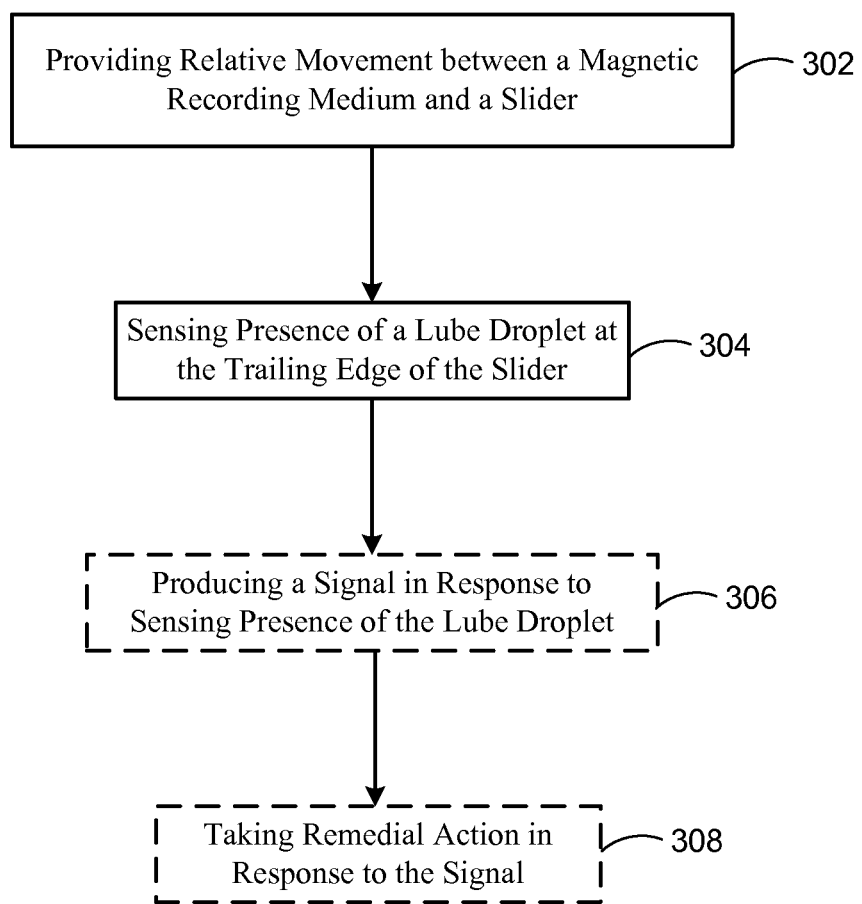
FIG. 3 is a flow chart of the method for detecting a lube droplet or lube bridge in accordance with various embodiments.

FIG. 3 is a flow chart of the detection method that can be implemented using the sensor 260 shown in FIG. 2. The method of FIG. 3 involves providing 302 relative movement between a magnetic recording medium and the slider. The method also involves sensing 304 presence of a lube droplet at the trailing edge of the slider. In some embodiments, the method further involves producing 306 a signal in response to sensing presence of the lube droplet. In further embodiments, the method can also involve taking remedial action 308 in response to the signal. For example, various operations can be performed to break up or change the lube droplet or lube bridge on the trailing edge of the slider. Representative remedial operations include performing a fast sweep, stop dwelling on the current track, or performing a load/unload of the head (e.g., read/write operations are suspended, the head is unloaded and parked over the ramp until the issue is resolved) operation.

Figure 4:
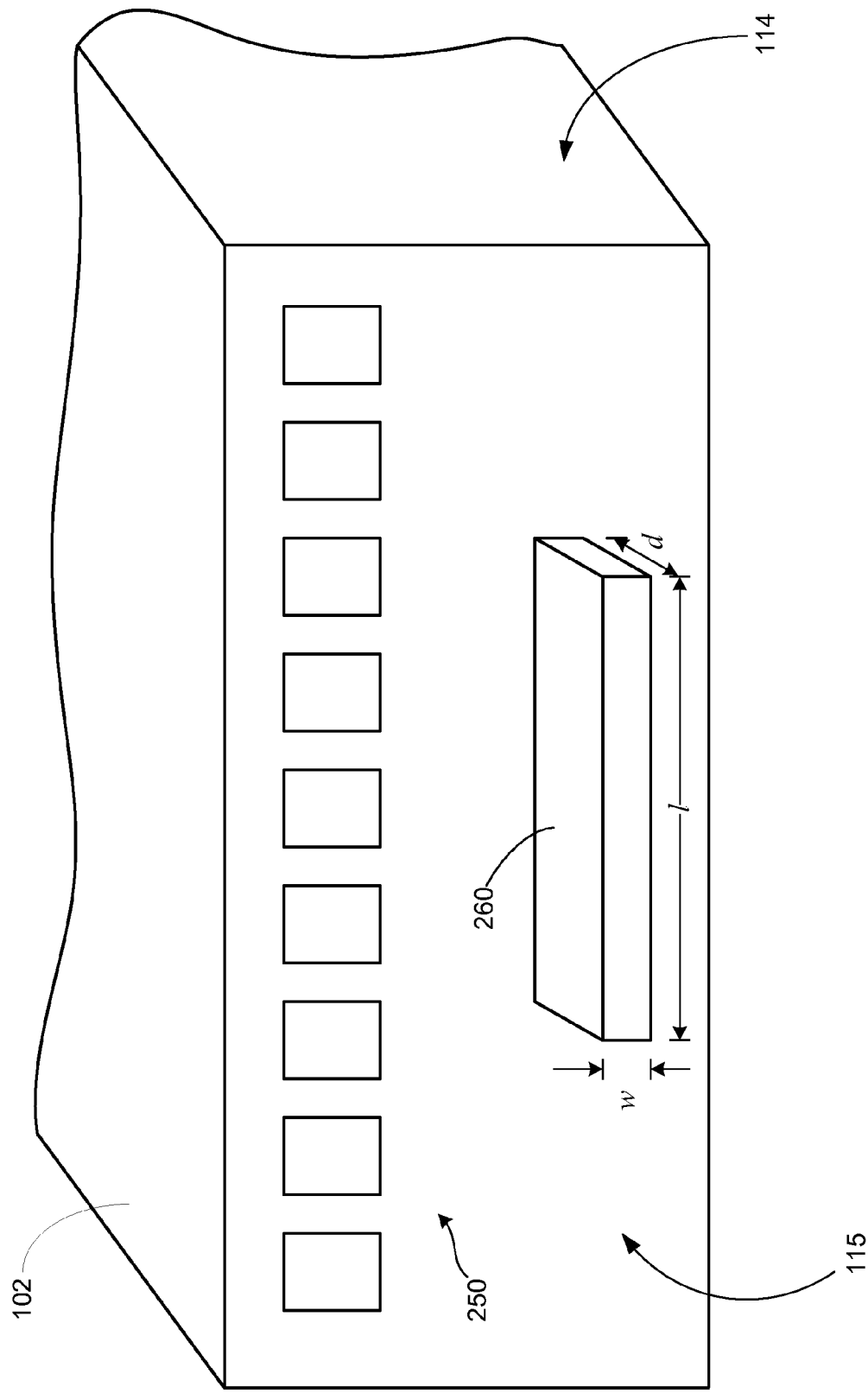
FIG. 4 illustrates a slider which includes a sensor configured for sensing a lube droplet or lube bridge at the trailing edge of the slider in accordance with various embodiments.

FIG. 4 illustrates a slider 102 which includes a sensor 260 configured for sensing a lube droplet or lube bridge at the trailing edge 115 of the slider 102 in accordance with various embodiments. In the embodiment shown in FIG. 4, the sensor 260 is formed as a metal wire or trace at the trailing edge 115 of the slider 102. The sensor 260 can be implemented as a thermal sensor and configured to monitor changes in heat transfer to/from the sensor 260. Suitable materials for fabricating the sensor 260 include NiFe, Ni, Ru, Cr, W and other materials that have a relatively high thermal coefficient of resistance (TCR). According to various embodiments, the sensor 260 can have a length, l, of between about 0.1 and 100 μm, such as between about 20 and 30 μm. The sensor 260 can have a width, w, or diameter of between about 0.1 and 100 μm, such as between 0.5 and 5 μm. The sensor 260 can have the depth of about 100 nm, such as between 40 and 80 nm. The trade-off between increased sensitivity to detecting smaller size droplets versus the need for increased number of elements in the sensor array using shorter length or smaller width sensors would be considered in practice. In some embodiments, the sensor 260 is formed as a thin-film sensor, rather than a wire or a trace. In such embodiments, the thin-film sensor 260 can have a thickness of between about 10 nm and 100 nm, for example. In some embodiments, a single sensing element can run along the entire width of the slider (along the trailing edge), i.e., length (l)~slider width.

Figure 5:
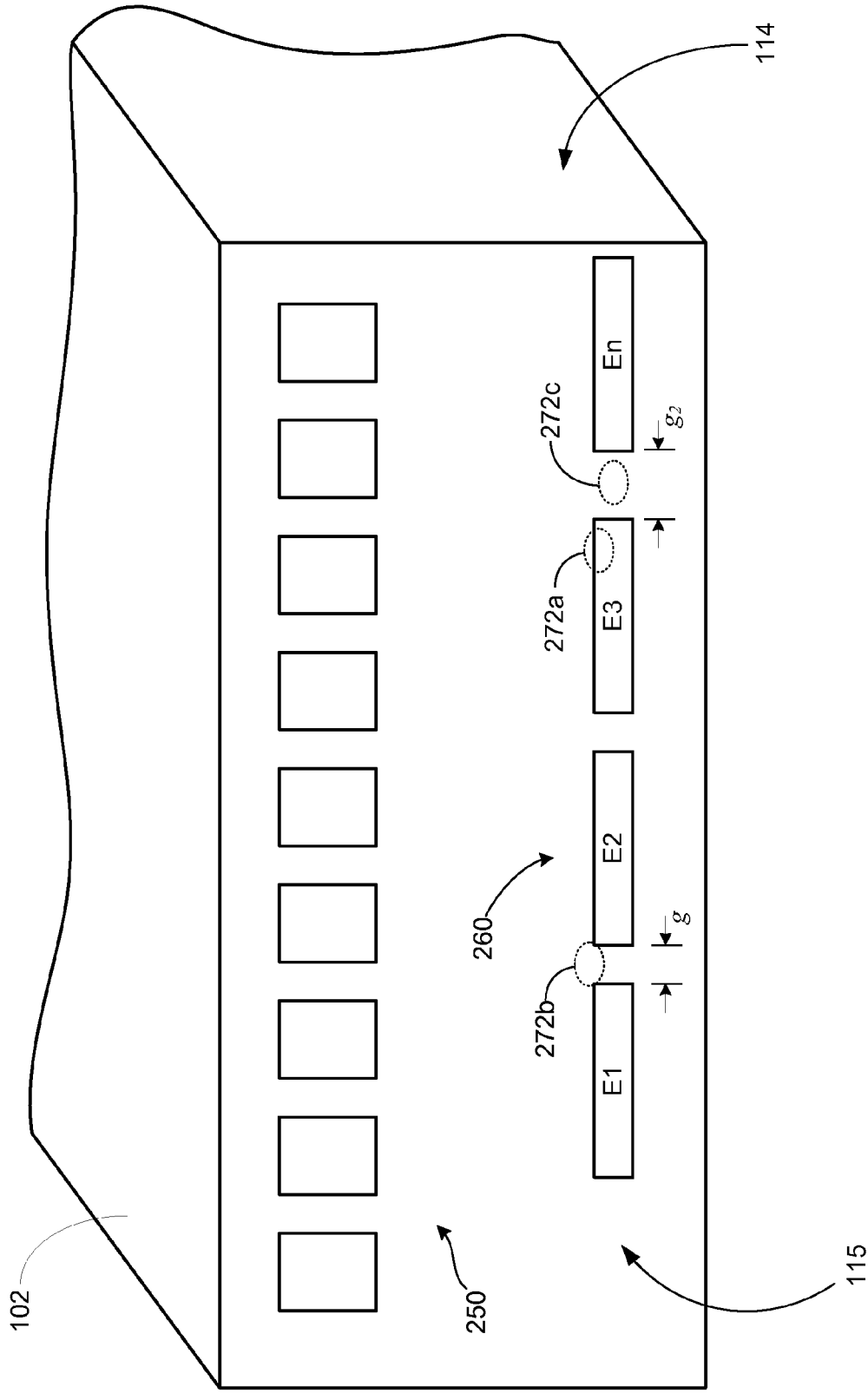
FIG. 5 illustrates a slider which includes a sensor configured for sensing a lube droplet or lube bridge at the trailing edge of the slider in accordance with various embodiments.

FIG. 5 illustrates a slider 102 which includes a sensor 260 configured for sensing a lube droplet or lube bridge at the trailing edge 115 of the slider 102 in accordance with various embodiments. In the embodiment shown in FIG. 5, the sensor 260 comprises a multiplicity of sensing elements, E1-En. In some embodiments, individual sensing elements E1-En are configured to sense the presence of a lube droplet 272 or lube bridge in response to contact with the lube droplet 272 or lube bridge. For example, sensing element E3 shown in FIG. 5 senses presence of a lube droplet 272a in response to the lube droplet 272a contacting the sensing element E3. It is noted that a lube droplet 272 or lube bridge generally grows in size over time and may be sensed by the sensing element E3 after achieving a relatively large size (e.g., ~10-15 μm or larger).

In other embodiments, pairs of sensing elements E1-En are configured to sense the presence of a lube droplet 272 or lube bridge in response to contact between the lube droplet/bridge 272 and a pair of sensing elements. In such embodiments, a gap, g, is provided between adjacent sensing elements E1-En and sized to allow for detection of a lube droplet 272 having a predetermined range of size. For example, the lube droplet 272b shown in FIG. 5 is at least partially captured within a gap, g, provided between sensing elements E1 and E2. By way of illustration and not of limitation, a lube droplet of interest may have a predetermined size of between 20 and 30 μm. The gap, g, can be dimensioned to be somewhat smaller than the predetermined size of the lube droplet of interest, such as about 15 μm. The gap, g, is preferably sized to allow at least partial capture of a lube droplet of interest while allowing the lube droplet contact adjacent sensing elements. For example, lube droplet 272b shown in FIG. 5 is partially captured within the gap, g, while contacting both sensing elements E1 and E2. The sensor 260 senses the presence of the lube droplet 272b in contact with both sensing elements E1 and E2, such as by sensing a change in resistance. For example, contact with sensing elements E1 and E2 by the lube droplet 272b can cause shorting between the pair of sensing elements, resulting in a reduction in resistance of the sensor 260.

According to other embodiments, the gap can be sized to allow full capture of a lube droplet of interest between adjacent sensing elements. The gap, $g_2$, shown between sensing elements E3 and En, for example, has a size greater than the width or diameter of the lube droplet 272c of interest. For example, the lube droplet 272c of interest may have a size ranging between about 20 and 40 μm, and the gap, $g_2$, may have a size of at least 45 to 50 μm. The sensor 260 can sense the presence of the lube droplet 272c falling between adjacent sensing elements E3 and En by sensing a change in capacitance between sensing elements E3 and En. It is noted that one or a combination of these sensing approaches can be implemented by the sensor 260. For example, the sensor 260 can be implemented to sense a change of resistance of individual sensing elements, a change of resistance between adjacent sensing elements, a change of capacitance between adjacent sensing elements, or any combination of these sensing approaches.

FIG. 6 illustrates a slider 102 which includes a sensor 260 configured for sensing a lube droplet or a lube bridge at the trailing edge 115 of the slider 102 in accordance with various embodiments. The sensor 260 shown in FIG. 6 includes a two-dimensional array of sensing elements, E1-En, situated on the trailing edge 115 of the slider 102. Implementing the sensor 260 is a two-dimensional array of sensing elements increases the effective surface area that is capable of sensing formation of lube droplets and lube bridges on the trailing edge 115 of the slider 102. The sensor 260 shown in FIG. 6 can be implemented in the various manners described previously with regard to FIG. 5.

FIG. 7 illustrates a slider 102 which includes a sensor 260 configured for sensing a lube droplet or lube bridge at a trailing edge 115 of the slider 102 in accordance with some embodiments. The sensor 260 shown in FIG. 7 is implemented as a thermal sensor comprising a single sensing element. For example, the sensor 260 can be implemented as a wire or trace having a relatively high TCR (or a thin film element). One end of the sensor 260 is coupled to a first bond pad 250 (P6), and the other end of the sensor 260 is coupled to a second bond pad 250 (P9). A detector 215 is coupled to the slider 102 and, more particularly, coupled to the sensor 260. The sensor 260 is biased by the bond pads P6 and P9, preferably with a constant current (DC), such that the sensor 260 is hotter than ambient temperature. The sensor 260 is configured to measure a change in heat transfer due to the presence of a lube droplet 272 or lube bridge.

Formation of a lube droplet 272 or lube bridge at the sensor 260 changes the heat transfer boundary condition of the sensor 260, resulting in cooling of the sensor 260. This cooling of the sensor 260 causes a change in resistance in the sensor 260 and a corresponding voltage change across the bond pads P6 and P9. This voltage change can be detected by the detector 215. The detector 215 can include a comparator 217 which receives an output signal from the sensor 260 (e.g., a voltage change across bond pads P6 and P9) and compares the sensor signal with a reference signal or value. The reference signal or value can be a signal/value indicative of a predetermined detection threshold. For example, the detector 215 can be configured to detect a percentage change in the output signal of the sensor 216, such as a 2%, 5%, or 10% change.

FIG. 8 illustrates a slider 102 which includes a sensor 260 configured for sensing a lube droplet or a lube bridge at a trailing edge 115 of the slider 102 in accordance with various embodiments. The sensor 260 shown in FIG. 8 is implemented as a thermal sensor comprising an array of sensing elements, E1-En. Each of the sensing elements, E1-En, can be implemented as a wire or trace having a relatively high TCR. In other embodiments, the sensing elements, E1-En, can be implemented as thin-film elements. The length, width, and depth of the sensing elements E1-En and the gap between sensing elements can be determined based on the size of the lube droplets and/or lube bridges of interest. One end of the sensor array 260 is coupled to a first bond pad 250 (P1) and the other end of the sensor array 260 is coupled to a second bond pad 250 (P9). In some embodiments, the sensing elements, E1-En, are connected in series. In other embodiments, the sensing elements, E1-En, are connected in parallel.

In a manner similar to that described in FIG. 7, formation of a lube droplet 272 or lube bridge at one or more of the sensing elements E1-En changes the heat transfer boundary condition of the sensing element(s), resulting in cooling of the sensing element(s). Cooling of the one or more sensing elements causes a change in resistance in the sensor 260 and a corresponding voltage change across the bond pads P1 and P9. This voltage change can be detected by the detector 215.

Figure 9:
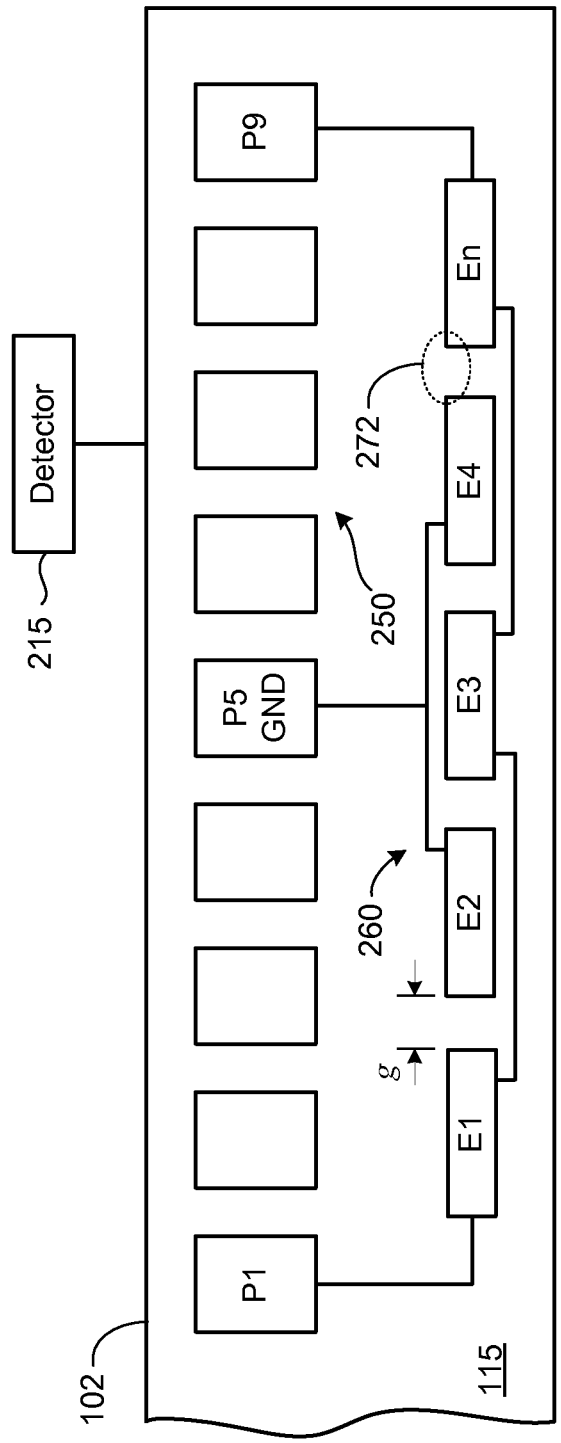
FIG. 9 illustrates a slider which includes an electrical sensor configured for sensing a lube droplet or lube bridge at the trailing edge of the slider in accordance with various embodiments.

FIG. 9 illustrates a slider 102 which includes a sensor 260 configured for sensing a lube droplet or a lube bridge at a trailing edge 115 of the slider 102 in accordance with various embodiments. The sensor 260 shown in FIG. 9 differs from the sensors described previously with regard to FIGS. 7 and 8 in terms of structure and function. The sensor 260 shown in FIG. 9 is configured to sense electrical continuity between adjacent sensing elements E1-En due to the presence of a lube droplet or a lube bridge, rather than changes in heat transfer from the sensor elements. The sensor 260 of FIG. 9 includes a multiplicity of electrically conductive sensing elements, E1-En, with a gap, g, provided between adjacent sensing elements. The gap, g, is sized such that a lube droplet 272 can fall at least partially between a pair of the sensing elements, E1-EN, but remain in contact with the pair of sensing elements. For example, the lube droplet 272 shown in FIG. 9 is captured at least partially between sensing elements E4 and En, but remains in physical contact with each of elements E4 and En.

The sensing elements, E1-En, of the sensor 260 are connected such that alternating sensing elements are connected to different electrical circuits. For example, sensing elements E1, E3, and En are connected in series to a first circuit that is coupled to bond pads P1 and P9, which bias these sensing elements of the sensor 260. Intervening sensing elements E2 and E4, however, are connected to a second circuit that is coupled to a ground pad, P5. Formation of a lube droplet or a lube bridge between adjacent sensing elements, such as droplet 272 formed between sensing elements E4 and En, closes the circuit between sensing elements E4 and En, causing electrical shorting between these sensing elements. Development of a short-circuit (or a reduction in resistance) within the sensor 260 can be readily detected by the detector 215 as a reduction in voltage across bond pads P1 and P9.

In another embodiment (cf. FIG. 5), a sinusoidal voltage or current input can be applied at a different frequency across of each of the sensor elements (E1, E2, . . . En) and the sensed output signal can be combined, multiplexed and process to detect accumulation of droplets as well as the location(s) of droplet accumulation.

Figure 10:
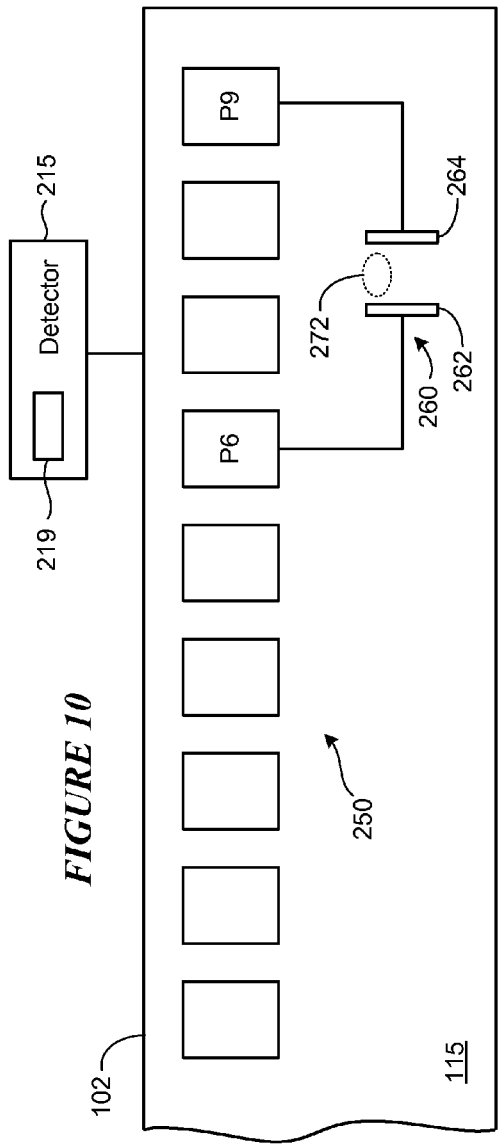
FIG. 10 illustrates a slider which includes a capacitance sensor configured for sensing a lube droplet or lube bridge at the trailing edge of the slider in accordance with various embodiments.

FIG. 10 illustrates a slider 102 which includes a sensor 260 configured for sensing a lube droplet or a lube bridge at a trailing edge 115 of the slider 102 in accordance with various embodiments. The sensor 260 shown in FIG. 10 is configured as a capacitance sensor. The sensor 216 includes a first conductor 262 spaced apart from a second conductor 264. The first conductor 262 is coupled to a first bond pad 250 (P6). The second conductor 264 is coupled to a second bond pad 250 (P9). Air serves as a dielectric between the two conductors 262 and 264. The capacitance between the first and second conductors 262 and 264 can be measured and stored in the detector 215 as a reference capacitance. According to some embodiments, and using the length, width, and depth references shown in FIG. 4, the conductors 262 and 264 can have a length of between about 100 nm and 10 µm, a width of between about 5 µm and 20 µm, and a depth of between about 10 µm and 40 µm. According to various embodiments, each of the conductors 262 and 264 can have a surface area of between about 50 µm$^2$ and 800 µm$^2$. If necessary, the depth can be increased further (not geometrically constrained) to increase surface area of the conductors/electrodes. Further, the width can also be increased beyond the stated 20 μm with alternate bond pad layouts.

Formation of a lube droplet 272 or a lube bridge between the first and second conductors 262 and 264 changes the composition of the dielectric between the conductors 262 and 264. For example, the dielectric constant can change from ~1.0 for air to ~2-3, which is typical for perfluoropolyether (PFPE) lubricants. This change in the dielectric composition due to the presence of the lube droplet 272 or lube bridge causes a change in the capacitance of the sensor 260. This change in capacitance sensed by the sensor 260 can be detected by the detector 215. For example, the detector 215 can be configured to compare the changed capacitance of the sensor 260 with a previously stored reference capacitance 219 (with no lube present between the conductors 262 and 264). A deviation beyond a predetermined threshold (e.g., a percentage difference of 2%, 5%, or 10%) between the two capacitance values indicates presence of a lube droplet 272 or do bridge at the trailing edge 115 of the slider 102.

According to some embodiments, the detector 215 is implemented as part of a preamp of a hard disk drive which incorporates the capacitance sensor 260 shown in FIG. 10. The preamp can include an integrated capacitive-to-digital converter which receives an analog signal produced by capacitance sensor 260 and converts this signal to a digital signal. The digital signal can be compared to the previously stored reference capacitance, which can be stored in a memory of the preamp. It is noted that capacitive sensing of lube droplets or lube bridges using the sensor 260 shown in FIG. 10 is highly immune to spacing dependence of the slider 102 relative to a magnetic recording medium.

Figure 11:
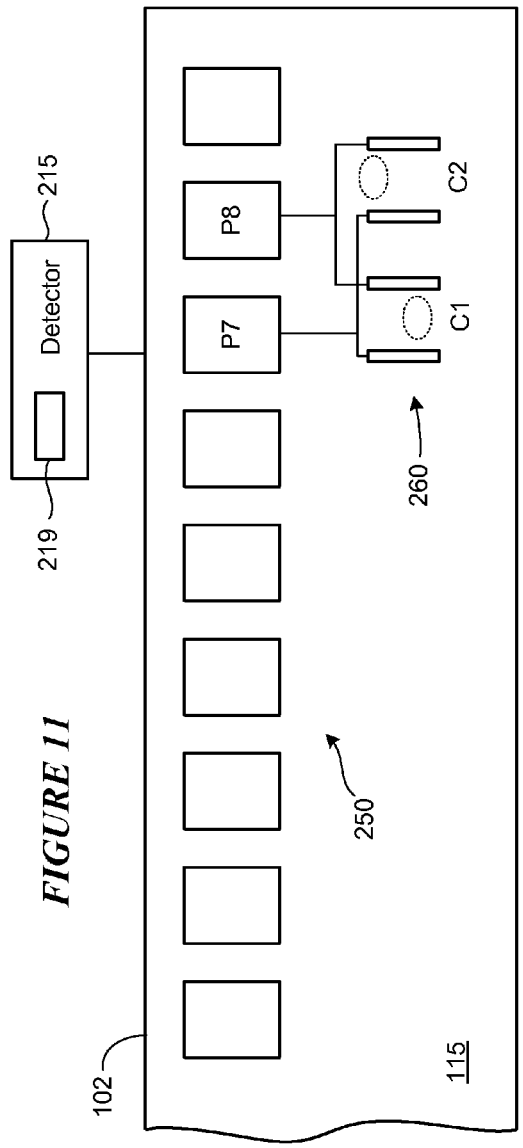
FIG. 11 illustrates a slider which includes a capacitance sensor configured for sensing a lube droplet or lube bridge at the trailing edge of the slider in accordance with various embodiments.

FIG. 11 illustrates a slider 102 which includes a multiplicity of the capacitance sensors 260 shown in FIG. 10. Although the capacitance sensor 260 shown in FIG. 11 includes a multiplicity of individual capacitive sensing elements (e.g., C1 and C2), the capacitance sensor 260 only requires two bond pads (e.g., bond pads P7 and P8) for proper operation. Each capacitive sensing element, C1 and C2, includes a first conductor coupled to one of the bond pads (P7) and a second conductor coupled to another bond pad (P8). Although two capacitive sensing elements (C1 and C2) are shown in FIG. 11, it is understood that any number of capacitive sensing elements can be implemented in the capacitance sensor 260 shown in FIG. 11. Sensing of one or more lube droplets or lube bridges can be sensed by the sensor 260 in a manner described previously with regard to FIG. 10.

Figure 12:
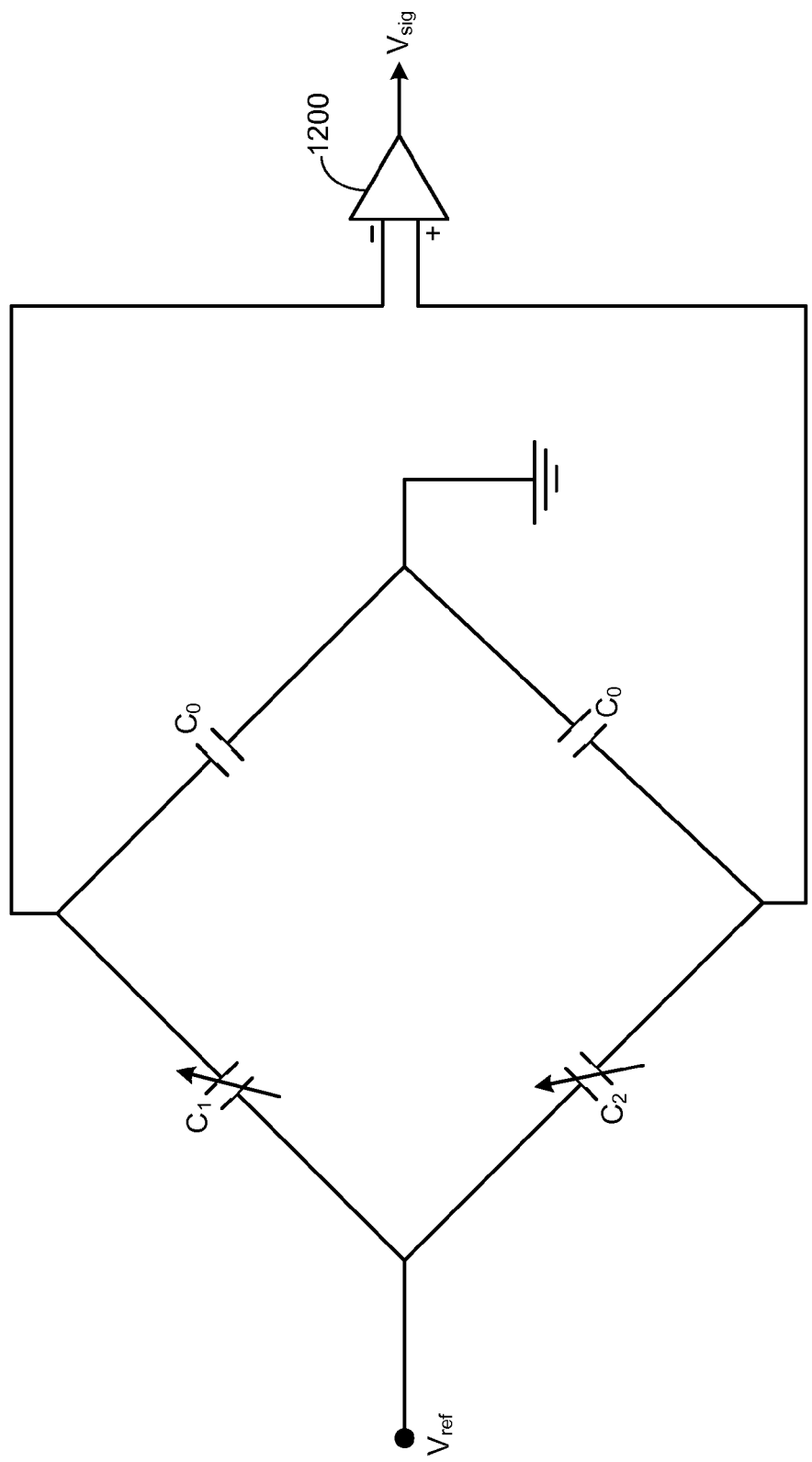
FIG. 12 illustrates a slider which includes a capacitance sensor configured for sensing a lube droplet or lube bridge at the trailing edge of the slider in accordance with various embodiments.

FIG. 12 illustrates an arrangement of capacitance sensors that can be implemented on a trailing edge of a slider in accordance with various embodiments. The capacitance sensors, $C_0$, $C_1$, $C_2$, can be arranged to form a Wheatstone bridge with an output coupled to an operational amplifier 1200. Nominally, $C_0$ would be set equal to $C_1$ and $C_2$ when no contaminant/lube droplets are present at the trailing edge face (baseline). In this state, the bridge circuit of FIG. 12 would be balanced ideally with zero sense signal output. In FIG. 12, two capacitive sensing elements, C1 and C2, are illustrated as having a variable capacitance. Each of sensing elements C1 and C2 is configured to sense for formation of a lube droplet or a lube bridge at the trailing edge of a slider. Capacitive sensing elements $C_0$ have a fixed known capacitance. A reference voltage, $V_{ref}$, is provided to the bridge by a first bond pad and the opposite leg of the bridge is coupled to a ground pad. The operational amplifier 1200 can be part of a detector (situated away from the trailing edge of the slider), which produces an output signal, $V_{sig}$, in response to changes in capacitance of either of the two capacitive sensing elements $C_1$ and $C_2$. The output signal, $V_{sig}$, can be compared to a reference signal to detect formation of a lube droplet or lube bridge at the trailing edge of the slider. The bridge circuit configuration shown in FIG. 12 increases the sensitivity of droplet detection manifold, since in such a scheme only the change in capacitance would be amplified and sensed. In some embodiments, a multiplicity of the Wheatstone bridge circuits shown in FIG. 12 can be connected in series to form larger capacitance sensor arrays.

Figure 13:
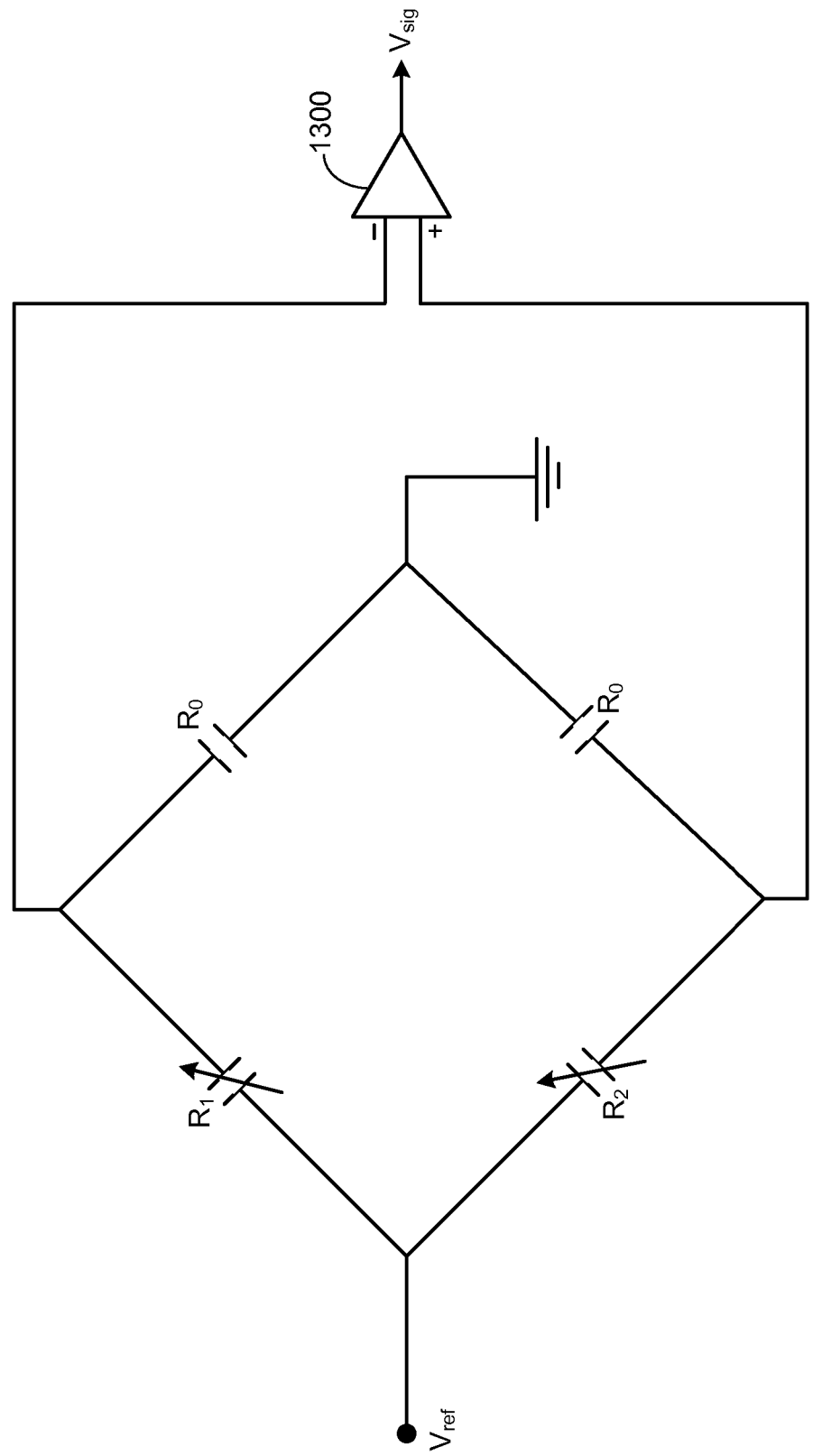
FIG. 13 illustrates an arrangement of thermal sensors that can be implemented on a trailing edge of a slider in accordance with various embodiments.

FIG. 13 illustrates an arrangement of thermal sensors (e.g., resistive temperature sensors) that can be implemented on a trailing edge of a slider in accordance with various embodiments. Similar to the configuration shown in FIG. 12, the thermal sensors, $R_0$, $R_1$, $R_2$, can be arranged to form a Wheatstone bridge with an output coupled to an operational amplifier 1300 (situated away from the trailing edge of the slider). Nominally, $R_0$ would be set equal to $R_1$ and $R_2$ when no contaminant/lube droplets are present at the trailing edge face (baseline). In this state, the bridge circuit of FIG. 13 would be balanced ideally with zero sense signal output. In FIG. 13, two resistive sensing elements, R1 and R2, are illustrated as having a variable resistance. Each of resistive sensing elements R1 and R2 is configured to sense for formation of a lube droplet or a lube bridge at the trailing edge of a slider. Resistive sensing elements $R_0$ have a fixed known resistance. A reference voltage, $V_{ref}$, is provided to the bridge by a first bond pad and the opposite leg of the bridge is coupled to a ground pad. The operational amplifier 1300 can be part of a detector, which produces an output signal, $V_{sig}$, in response to changes in resistance of either of the two resistive sensing elements $R_1$ and $R_2$. The output signal, $V_{sig}$, can be compared to a reference signal to detect formation of a lube droplet or lube bridge at the trailing edge of the slider. The bridge circuit configuration shown in FIG. 13 increases the sensitivity of droplet detection manifold, since in such a scheme only the change in resistance would be amplified and sensed. In some embodiments, a multiplicity of the Wheatstone bridge circuits shown in FIG. 13 can be connected in series to form larger resistive sensor arrays.

Figure 14:
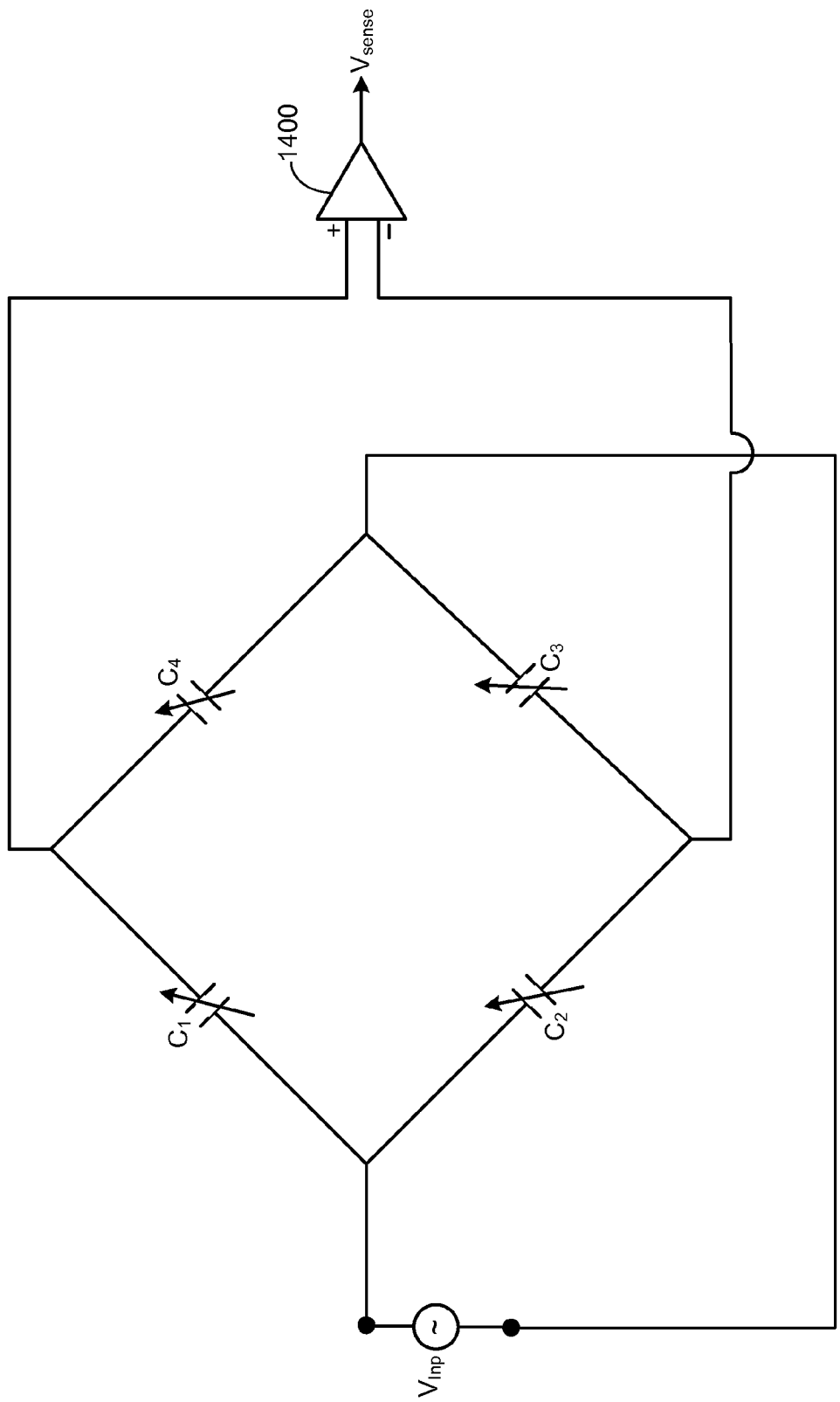
FIG. 14 illustrates an arrangement of capacitance sensors that can be implemented on a trailing edge of a slider in accordance with various embodiments.

FIG. 14 illustrates an arrangement of capacitance sensors that can be implemented on a trailing edge of a slider in accordance with various embodiments. The capacitance sensors $C_1$, $C_2$, $C_3$, and $C_4$ are arranged to form a Wheatstone bridge with an output coupled to an operational amplifier 1400 (situated away from the trailing edge of the slider). In the embodiment of FIG. 14, each of the capacitance sensors $C_1$, $C_2$, $C_3$, and $C_4$ is configured to sense formation of a lube droplet or lube bridge (or other contaminant). A change in capacitance across any one of the capacitance sensors $C_1$, $C_2$, $C_3$, and $C_4$ due to presence of a lube droplet/bridge or other contaminant results in development of a sensed voltage, $V_{sense}$, at the output of the sensing arrangement. The sensor embodiment illustrated in FIG. 14 is conservative on bond pads and provides differential sensing so that common-mode noise rejection is inherently performed.

According to an alternative embodiment, the sensor arrangement shown in FIG. 14 can be populated with resistive temperature sensors (e.g., DETCRs) instead of capacitance sensors. In such an embodiment, capacitance sensors $C_1$, $C_2$, $C_3$, and $C_4$ would be replaced by resistive temperature sensors $R_1$, $R_2$, $R_3$, and $R_4$. A change in resistance across any one of the resistive temperature sensors $R_1$, $R_2$, $R_3$, and $R_4$ due to presence of a lube droplet/bridge or other contaminant results in development of a sensed voltage, $V_{sense}$, at the output of the sensing arrangement.

Figure 15:
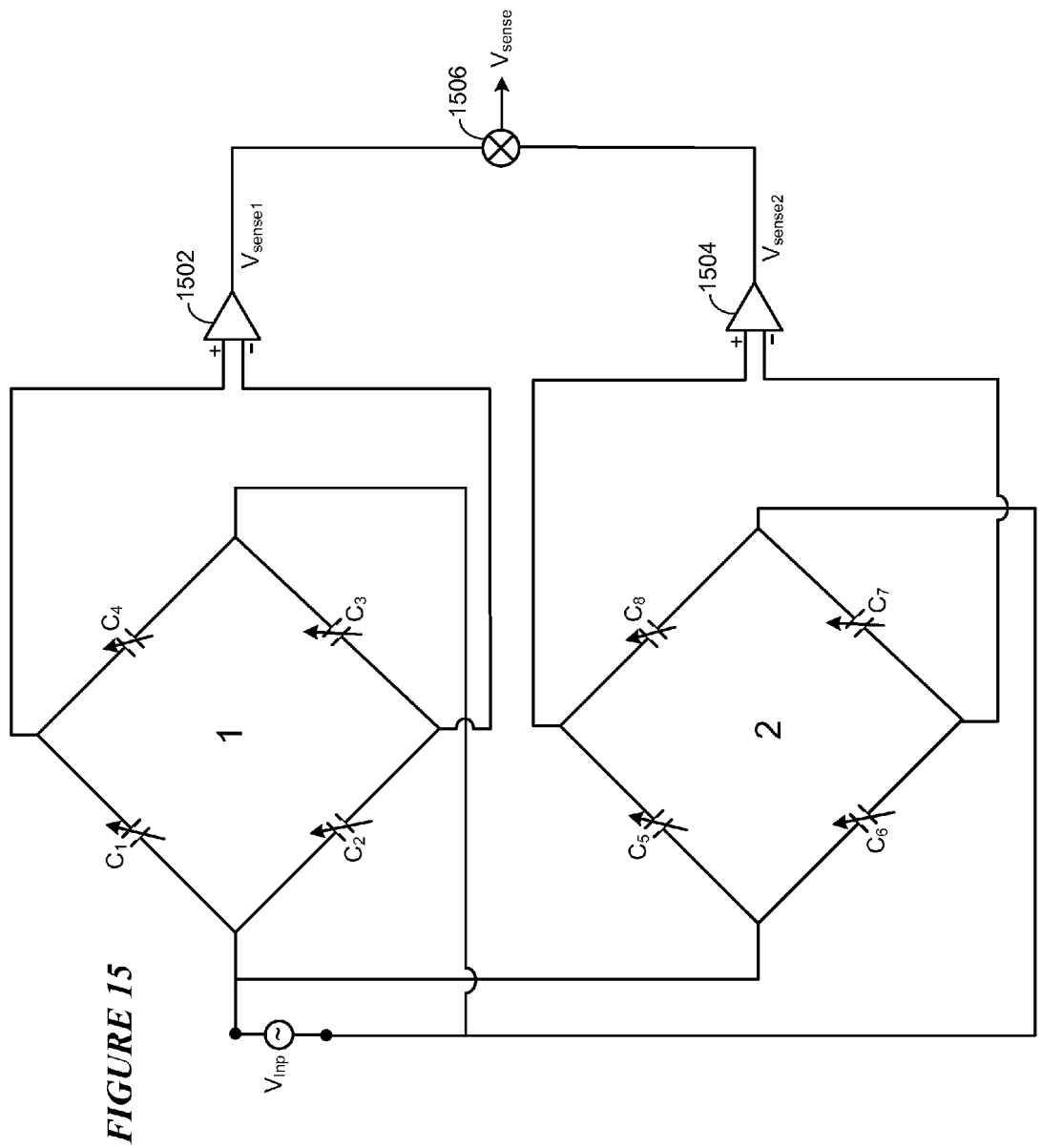
FIG. 15 illustrates arrays of capacitance sensors that can be implemented on a trailing edge of a slider in accordance with various embodiments.

FIG. 15 illustrates an arrangement of capacitance sensors that can be implemented on a trailing edge of a slider in accordance with various embodiments. FIG. 15 shows a large array of capacitance sensor C1-C8 arranged in two Wheatstone bridges 1 and 2 each driven by an input, $V_{inp}$. Each bridge 1 and 2 has an output coupled to a respective operational amplifier 1502 and 1504 (situated away from the trailing edge of the slider). In some embodiments, the outputs, $V_{sense\ 1}$ and $V_{sense\ 2}$, of the operational amplifiers 1502 and 1504 can be analyzed separated for a change in sensed voltage. In other embodiments, the outputs, $V_{sense\ 1}$ and $V_{sense\ 2}$, of the operational amplifiers 1502 and 1504 can be applied to a summer 1506 whose output, $V_{sense}$, can be analyzed for a change in sensed voltage. The sensor embodiment illustrated in FIG. 15 is conservative on bond pads and provides differential sensing so that common-mode noise rejection is inherently performed. In an alternative embodiment, the capacitance sensors $C_1$-$C_8$ can be replaced by resistive temperature sensors $R_1$-$R_8$.

Figure 16:
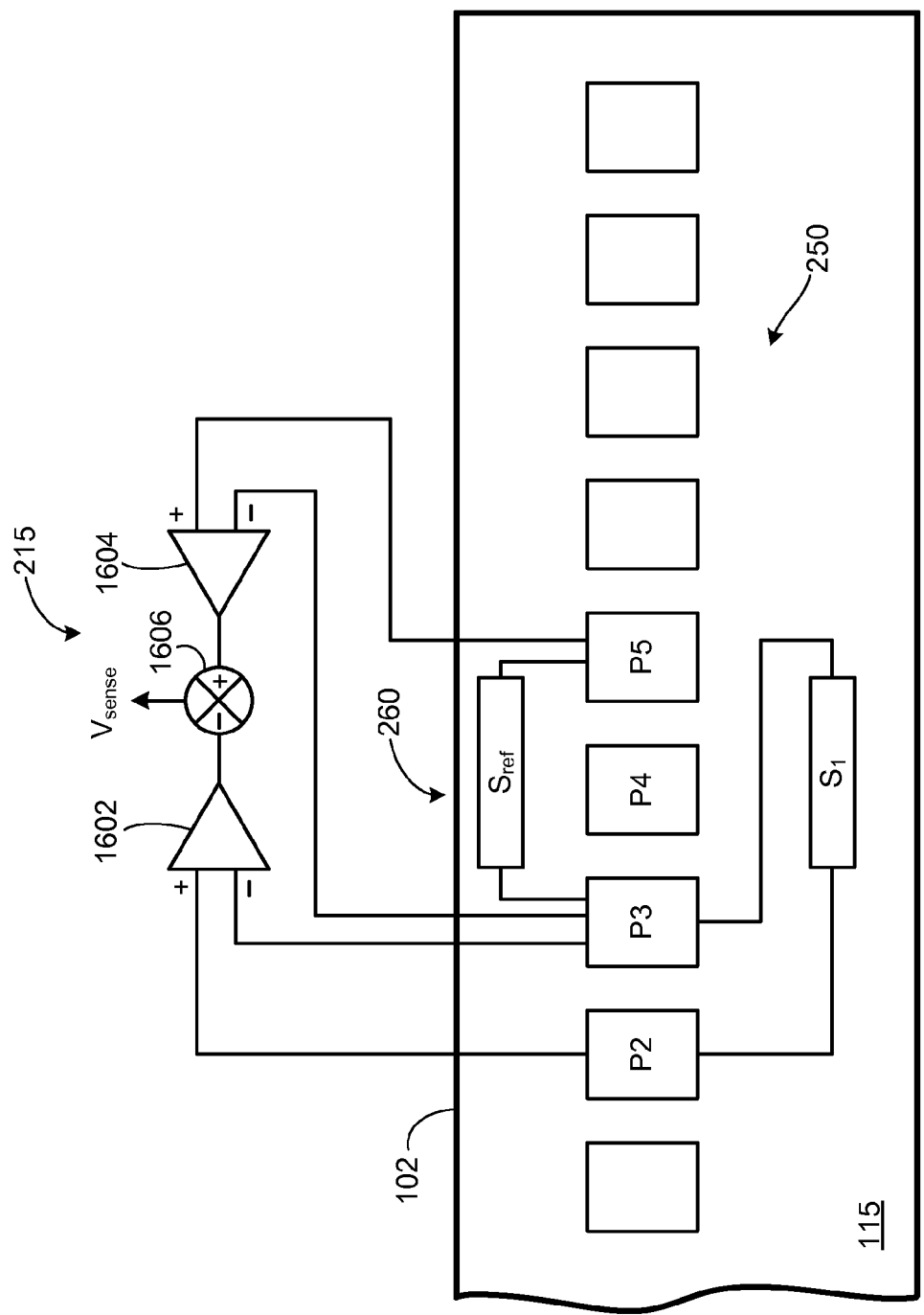
FIG. 16 illustrates a slider which includes a sensor configured for sensing a lube droplet or lube bridge (or other contaminant) at a trailing edge of a slider in accordance with some embodiments.

FIG. 16 illustrates a slider 102 which includes a sensor 260 configured for sensing a lube droplet or lube bridge (or other contaminant) at a trailing edge 115 of the slider 102 in accordance with some embodiments. The sensor 260 shown in FIG. 16 is implemented to include a first sensor, $S_1$, and a reference sensor, $S_{ref}$. The first sensor, $S_1$, is situated at a location of the trailing edge 115 where lube droplets/bridges actively form (or other contaminants accumulate). The reference sensor, $S_{ref}$, is situated at a location of the trailing edge 115 where lube droplets/bridges/contaminants do not actively form/accumulate, such as above the bond pads 250. In some embodiments, the first sensor, $S_1$, and the reference sensor, $S_{ref}$, are resistive temperature sensors. In other embodiments, the first sensor, $S_1$, and the reference sensor, $S_{ref}$, are capacitance sensors.

In the representative embodiment shown in FIG. 16, the first sensor, $S_1$, is coupled to bond pads P2 and P3, and the reference sensor, $S_{ref}$, is coupled to bond pads P3 and P5. In this representative example, the two sensors, $S_1$ and $S_{ref}$, share a common bond pad (i.e., bond pad P3). The sensor 260 is coupled to a detector 215 which typically resides away from the slider 102 (e.g., within the hard drive electronics). The detector 215 includes a first operational amplifier 1602 with inputs coupled to bond pads P2 and P3 respectively. A second operational amplifier 1604 of the detector 215 has inputs coupled to bond pads P3 and P5. Outputs of the first and second operational amplifiers 1602 and 1604 are respectively coupled to a summer 1606 having an output where a sensed voltage, $V_{sense}$, is provided.

The sensing arrangement shown in FIG. 16 provides differential sensing by the first sensor, $S_1$, relative to the reference sensor, $S_{ref}$. This arrangement provides common-mode noise rejection and compensation for the effect of changes in ambient drive temperature, humidity, pressure (altitude), etc. It is understood that a multiplicity of sensors, $S_1$-$S_n$, can be implemented in the embodiment shown in FIG. 16, and that a single sensor, S1, is shown for purposes of simplicity of explanation (see, e.g., sensor 260 shown in FIG. 9).

Figure 17:
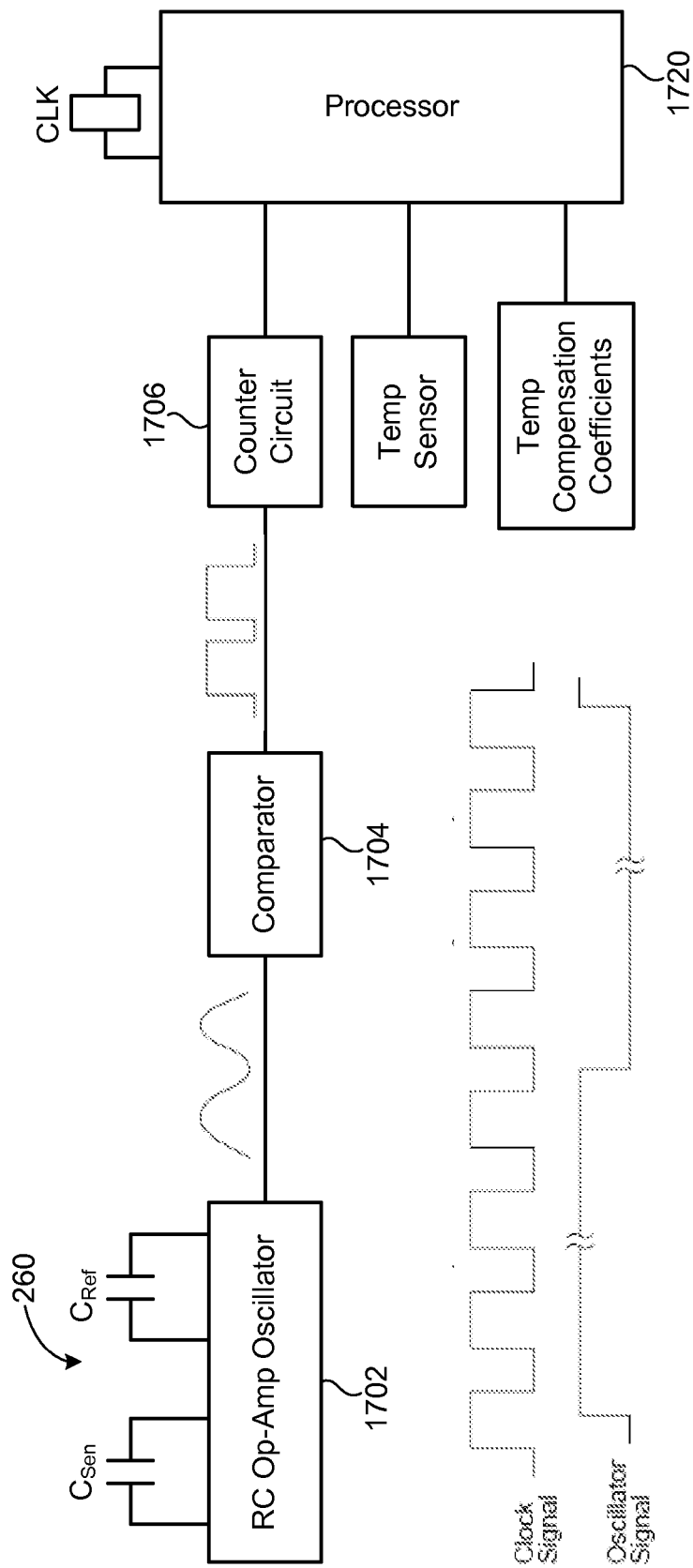
FIG. 17 illustrates a sensor configured for sensing a lube droplet or lube bridge (or other contaminant) at a trailing edge of the slider in accordance with some embodiments.

FIG. 17 illustrates a sensor 260 configured for sensing a lube droplet or lube bridge (or other contaminant) at a trailing edge of the slider in accordance with some embodiments. The sensor 260 includes capacitance sensors that can be part of an RC or RLC oscillator circuit. According to such embodiments, a change in capacitance due to lube droplet/contaminant accumulation between the conductors of the capacitance sensor can be sensed through a change in resonant frequency of the oscillator circuit using a tunable resistor. Alternatively, the resonance change can be detected using a frequency sweep with a fixed R (and L) value.

In the embodiment shown in FIG. 17, an RC oscillator circuit includes a sensor 260 coupled to an RC operational amplifier oscillator 1702. The sensor 206 includes a first capacitance sensor, $C_{Sen}$, and a reference capacitance sensor, $C_{Ref}$. The first capacitance sensor, $C_{Sen}$, is situated at a location of the slider's trailing edge where lube droplets/bridges/contaminants are expected to form/accumulate. The reference capacitance sensor, $C_{Ref}$, is situated at a location of the slider's trailing edge where lube droplets/bridges/contaminants are not expected to form/accumulate, such as above the bond pads. The first capacitance sensor, $C_{Sen}$, and the reference capacitance sensor, $C_{REF}$, are coupled to the RC oscillator 1702, which resides off of the slider (e.g., in the hard drive electronics). The oscillation frequency changes in response to accumulation of lube between the conductors of the first capacitance sensor, $C_{Sen}$.

The oscillation frequency can be determined by counting, by a counter circuit 1706, the number of clock pulses (i.e. MHz) in a time window that is formed by the square wave oscillator output (i.e. kHz) of a comparator circuit 1704. The counter circuit 1706 can be implemented with a digital logic counter circuit or by using the Time Processing Unit (TPU) channel of a microprocessor 1720. It is noted that, other than the sensor 260, all other components shown in FIG. 17 are located off of the slider, such as in the hard drive electronics. If desired, temperature correction can be accomplished by implementing a curve fitting routine with data obtained by calibrating the sensor 260 over the expected operating range. It will be appreciated that other RC and RLC oscillator circuits are contemplated, and the representative example shown in FIG. 17 is provided for non-limiting illustrative purposes.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
    a slider of a magnetic recording head, the slider having a leading edge, a trailing edge having an outside edge, and an air bearing surface between the leading and trailing edges; and
    a sensor situated at the outside edge of the trailing edge of the slider, the sensor configured to sense presence of a lube droplet or other contaminant at the outside edge of the trailing edge.

2. The apparatus of claim 1, wherein the sensor comprises a plurality of sensing elements.

3. The apparatus of claim 1, wherein the sensor comprises:

a first sensor situated at an active location of the outside edge of the trailing edge where a lube droplet forms or other contaminant accumulates; and a reference sensor situated away from the active location.

4. The apparatus of claim 1, wherein adjacent sensing elements are separated by a gap having a size related to a size of the lube droplet.

5. The apparatus of claim 1, wherein the sensor comprises a thermal sensor.

6. The apparatus of claim 1, wherein the sensor comprises an array of thermal sensors arranged in one or more Wheatstone bridge circuits.

7. The apparatus of claim 1, wherein the sensor comprises an open circuit, wherein presence of the lube droplet closes the open circuit.

8. The apparatus of claim 1, wherein the sensor comprises an RC or RLC oscillator circuit configured to change an oscillation frequency in response to sensing presence of the lube droplet or other contaminant.

9. The apparatus of claim 1, wherein the sensor comprises a capacitance sensor.

10. The apparatus of claim 1, wherein the sensor comprises an array of capacitance sensors arranged in one or more Wheatstone bridge circuits.

11. An apparatus, comprising:

a slider of a magnetic recording head, the slider having a leading edge, a trailing edge having an outside edge, and an air bearing surface between the leading and trailing edges;

a sensor situated at the outside edge of the trailing edge of the slider, the sensor configured to sense presence of a lube droplet at the outside edge of the trailing edge; and a detector coupled to the sensor, the detector configured to generate a signal in response to the sensor sensing presence of the lube droplet or other contaminant.

12. The apparatus of claim 11, wherein the detector comprises a comparator configured to compare a signal produced by the sensor to a reference signal indicative of a detection threshold.

13. The apparatus of claim 11, wherein:

the sensor comprises a capacitance sensor; and the detector is configured to convert a capacitance of the capacitance sensor to a digital signal, and compare the digital signal to a reference signal indicative of a detection threshold.

14. The apparatus of claim 11, wherein the detector is configured to detect closing of an open circuit of the sensor.

15. The apparatus of claim 11, wherein the sensor comprises one or more of a thermal sensor, a capacitance sensor, and a sensor configured to sense closing of an open circuit.

16. A method, comprising:

providing relative movement between a magnetic recording medium and a slider of a magnetic recording head, the medium comprising a layer of lubrication and the slider having a leading edge, a trailing edge having an outside edge, and an air bearing surface between the leading and trailing edges; and sensing presence of a lube droplet or other contaminant at the outside edge of the trailing edge.

17. The method of claim 16, wherein sensing comprises sensing a change in resistance at the outside edge of the trailing edge in response to presence of the lube droplet or other contaminant.

18. The method of claim 16, wherein sensing comprises sensing a change in capacitance at the outside edge of the trailing edge in response to presence of the lube droplet or other contaminant.

19. The method of claim 16, wherein sensing comprises sensing closing of an open circuit at the outside edge of the trailing edge in response to presence of the lube droplet or other contaminant.

20. The method of claim 16, wherein sensing comprises sensing a change in frequency of an oscillator circuit in response to presence of the lube droplet or other contaminant.

* * * * *